United States Patent
Li et al.

(10) Patent No.: US 11,923,537 B2
(45) Date of Patent: Mar. 5, 2024

(54) NEGATIVE ELECTRODE PLATE, SECONDARY BATTERY, AND APPARATUS CONTIANING THE SECONDARY BATTERY

(71) Applicant: Contemporary Amperex Technology Co., Limited, Ningde (CN)

(72) Inventors: Jing Li, Ningde (CN); Yang Zhang, Ningde (CN); Qingrui Xue, Ningde (CN); Wei Li, Ningde (CN)

(73) Assignee: Contemporary Amperex Technology Co., Limited, Ningde (CN)

( * ) Notice: Subject to any disclaimer, the term of this patent is extended or adjusted under 35 U.S.C. 154(b) by 0 days.

(21) Appl. No.: 17/547,265

(22) Filed: Dec. 10, 2021

(65) Prior Publication Data
US 2022/0102709 A1    Mar. 31, 2022

Related U.S. Application Data

(63) Continuation of application No. PCT/CN2020/087438, filed on Apr. 28, 2020.

(30) Foreign Application Priority Data

Mar. 20, 2020 (CN) .......................... 202010201599.0

(51) Int. Cl.
*H01M 4/36* (2006.01)
*H01M 4/587* (2010.01)
(Continued)

(52) U.S. Cl.
CPC .......... *H01M 4/366* (2013.01); *H01M 4/587* (2013.01); *H01M 10/0525* (2013.01);
(Continued)

(58) Field of Classification Search
None
See application file for complete search history.

(56) References Cited

U.S. PATENT DOCUMENTS

| 2014/0186702 A1* | 7/2014 | Takahata | H01M 4/133 429/211 |
| 2018/0287145 A1* | 10/2018 | Lee | H01M 4/133 |
| 2019/0027740 A1* | 1/2019 | Lee | H01M 4/62 |

FOREIGN PATENT DOCUMENTS

| CN | 103390753 A | 11/2013 |
| CN | 106469825 A | 3/2017 |

(Continued)

OTHER PUBLICATIONS

The International search report for PCT Application No. PCT/CN2020/087438, dated Nov. 4, 2020, 14 pages.
(Continued)

*Primary Examiner* — Zhongqing Wei
(74) *Attorney, Agent, or Firm* — East IP P.C.

(57) ABSTRACT

The present application discloses a negative electrode plate including a negative electrode active material layer including a first active material layer; wherein in a first cross section in a thickness direction of the negative electrode plate, the first active material has a size a in a direction parallel to the metal conductive layer, the first active material has a size b in the thickness direction, satisfying 0.8≤a/b≤20; in a second cross section in the thickness direction of the negative electrode plate, the first active material has a size c in the direction parallel to the metal conductive layer, the first active material has a size d in the thickness direction, satisfying 0.8≤c/d≤20; and the first cross section is parallel to a first direction, the second cross section is parallel to a second direction, and the first direction intersects the second direction.

19 Claims, 4 Drawing Sheets

(51) Int. Cl.
H01M 10/0525 (2010.01)
H01M 4/02 (2006.01)

(52) U.S. Cl.
CPC ............... *H01M 2004/021* (2013.01); *H01M 2004/027* (2013.01); *H01M 2220/20* (2013.01)

(56) References Cited

FOREIGN PATENT DOCUMENTS

| | | | |
|---|---|---|---|
| CN | 107221676 A | | 9/2017 |
| CN | 108832134 A | * | 11/2018 |
| CN | 108832134 A | | 11/2018 |
| CN | 109873166 A | | 6/2019 |
| CN | 110660957 A | | 1/2020 |
| CN | 110867560 A | | 3/2020 |
| WO | 0042669 A1 | | 7/2000 |
| WO | 2012101693 A1 | | 8/2012 |
| WO | 2014133070 A1 | | 9/2014 |

OTHER PUBLICATIONS

The extended European search report for European Application No. 20925320.2, dated Jun. 9, 2022, 6 pages.
The First Office Action for Chinese Application No. 202010201599.0, dated Jan. 9, 2023, 8 pages.

* cited by examiner

NEGATIVE ELECTRODE PLATE, SECONDARY BATTERY, AND APPARATUS CONTIANING THE SECONDARY BATTERY

CROSS-REFERENCE TO RELATED APPLICATION

This application is a continuation of International Application No. PCT/CN2020/087438, filed on Apr. 28, 2020, which claims priority to Chinese Patent Application No. 202010201599.0 filed on Mar. 20, 2020, both of which are incorporated herein by reference in their entireties.

TECHNICAL FIELD

The present application belongs to the technical field of energy storage apparatuses, and specifically relates to a negative electrode plate, a secondary battery, and an apparatus containing the secondary battery.

BACKGROUND

Secondary batteries represented by lithium-ion secondary batteries have advantages of relatively high energy density and output power, relatively long service life, low environmental pollution, no memory effect, and the like, so they have been widely used in various electronic products and electric apparatuses (such as electric vehicles). As the present application range of secondary batteries continues to expand, an important factor for improving user experience and satisfaction is that the battery has higher energy density. Therefore, how to further increase energy density is an important technical issue in the research and development of secondary batteries.

SUMMARY

The inventors found that, in order to meet stringent requirements for electrical conductivity and current collecting performance of negative electrode current collectors, the existing negative electrode plates generally adopt metal current collectors with a relatively large thickness (for example, from 8 μm to 30 μm), but the metal current collectors are relatively heavy, which is not beneficial for increasing energy density of batteries.

The inventors further found that, by disposing a metal conductive layer with relatively small thickness on a surface of an organic support layer with relatively low density, and disposing a negative electrode active material layer on the metal conductive layer, the resulting negative electrode plate is significantly lighter than the existing negative electrode plate, which is beneficial for increasing energy density of a battery. However, the cycle performance of a secondary battery using this negative electrode plate will deteriorate.

The inventors have conducted a lot of research and aimed to provide a negative electrode plate that enables a secondary battery adopting it to have relatively high energy density and relatively long cycle performance, a secondary battery containing the negative electrode plate, and an apparatus containing the secondary battery.

Therefore, the first aspect of the present application provides a negative electrode plate, including:
- a negative electrode current collector, including an organic support layer and a metal conductive layer disposed on at least one surface of the organic support layer; and
- a negative electrode active material layer, including at least a first active material layer, the first active material layer being disposed on the surface of the metal conductive layer away from the organic support layer, and the first active material layer including a first active material;
- wherein in a first cross section in a thickness direction of the negative electrode plate, the first active material has a particle size a in a direction parallel to the metal conductive layer, the first active material has a particle size b in the thickness direction, and a and b satisfy $0.8 \leq a/b \leq 20$; and
- in a second cross section in the thickness direction of the negative electrode plate, the first active material has a particle size c in the direction parallel to the metal conductive layer, the first active material has a particle size d in the thickness direction, and c and d satisfy $0.8 \leq c/d \leq 20$;
- the first cross section is parallel to a first direction, the second cross section is parallel to a second direction, and the first direction intersects with the second direction.

The second aspect of the present application provides a secondary battery, including the negative electrode plate according to the first aspect of the present application.

The third aspect of the present application provides an apparatus, including the secondary battery according to the second aspect of the present application.

The negative electrode plate provided by the present application includes a negative electrode current collector composed of a metal conductive layer and an organic support layer, which can reduce its own weight while meeting the requirements for the mechanical properties and electrical conductivity of the negative electrode current collector, thereby increasing gravimetric energy density of a secondary battery using the negative electrode plate. In addition, the first active material of the negative electrode active material layer satisfies a/b and c/d within specific ranges, which can effectively prevent the first active material from causing damage such as cracks to the metal conductive layer, so that the metal conductive layer can have and maintain good electrical conductivity, and thus the negative electrode plate has relatively low impedance and good charge and discharge performance. Therefore, the negative electrode plate can not only increase the energy density of the secondary battery, but also enables the secondary battery to have relatively long cycle performance. More preferably, the first active material is reasonably combined with a second active material to form the negative electrode active material layer with a double-layer structure, which can further improve the cycle performance and dynamic performance of the battery. The apparatus of the present application includes the secondary battery, and thus has at least the same advantages as the secondary battery.

DESCRIPTION OF THE DRAWINGS

In order to explain the technical solutions of the embodiments of the present application more clearly, the following will briefly introduce the drawings that need to be used in the embodiments of the present application. Obviously, the drawings described below are only some embodiments of the present application. A person of ordinary skill in the art can obtain other drawings based on the drawings without creative work.

DETAILED DESCRIPTION

Figure 1A:
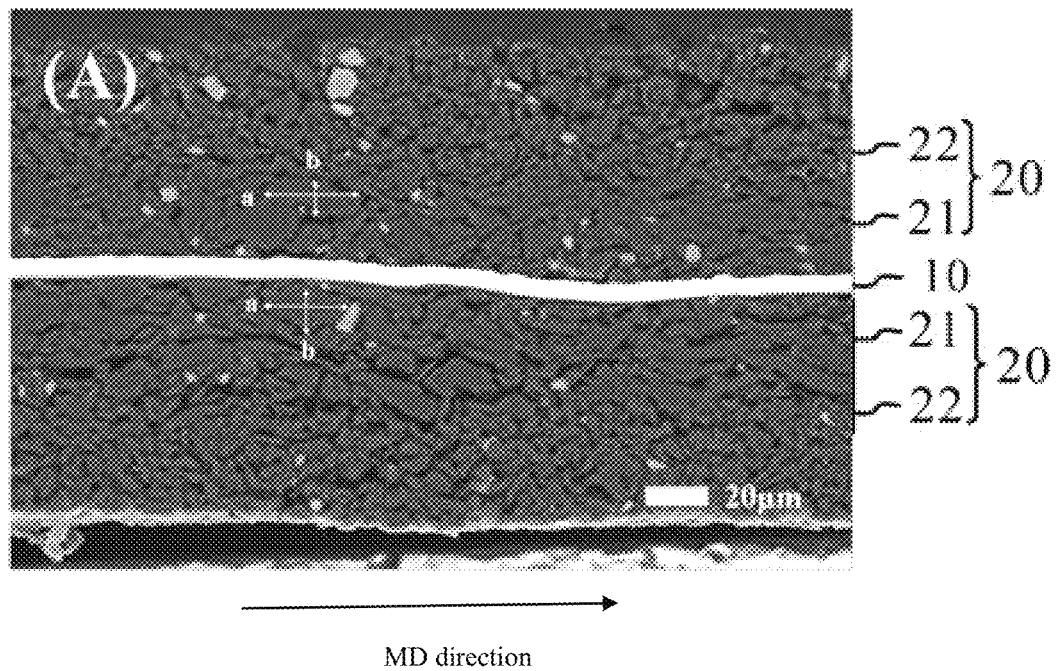
FIG. 1 is a first cross-sectional scanning electron microscope (SEM) image (A) and a second cross-sectional SEM image (B) of a negative electrode plate according to an embodiment of the present application.

In order to make the objectives, technical solutions and beneficial technical effects of the present application clearer, the present application will be further described in detail below in conjunction with embodiments. It should be understood that the embodiments described in this specification are only for explaining the application, not intending to limit the application.

For the sake of brevity, only certain numerical ranges are explicitly disclosed herein. However, any lower limit may be combined with any upper limit to form a range that is not explicitly described; and any lower limit may be combined with other lower limits to form an unspecified range, and any upper limit may be combined with any other upper limit to form an unspecified range. Further, although not explicitly specified, each point or single value between the endpoints of the range is included in the range. Thus, each point or single value can be combined with any other point or single value as its own lower limit or upper limit or combined with other lower limit or upper limit to form a range that is not explicitly specified.

In the description herein, it should be noted that, unless otherwise specified, a numeric range described with the term "above" or "below" includes the lower or upper limit itself, and "more" in "one or more" means two or more.

The above summary of the present application is not intended to describe each disclosed embodiment or every implementation in this application. The following description illustrates exemplary embodiments more specifically. In many places throughout the application, guidance is provided through a series of examples, which can be used in various combinations. In each instance, the enumeration is only a representative group and should not be interpreted as exhaustive.

Negative Electrode Plate

In order to obtain a secondary battery with higher energy density, a lighter negative electrode current collector may be selected. Therefore, the negative electrode plate may adopt a negative electrode current collector composed of a metal conductive layer and an organic support layer. However, the inventors found that, because the metal conductive layer is relatively thin and low in strength, it is prone to cracking and producing other damages during the production and storage of the negative electrode plate and the charge and discharge cycle of the battery, which will increase ohmic internal resistance and impedance of the battery and deteriorate the charge and discharge performance of the battery.

After a lot of research, the inventors found that the metal conductive layer can be effectively protected by adopting a specific type of active material in the negative electrode active material layer close to the metal conductive layer, thereby enabling the negative electrode plate to have relatively low resistance and good charge and discharge performance while reducing the weight of the negative electrode plate. Therefore, the battery adopting the negative electrode plate can have relatively high energy density and relatively long cycle performance.

Based on this, an embodiment of the present application provides a negative electrode plate, including a negative electrode current collector and a negative electrode active material layer disposed on the negative electrode current collector; the negative electrode current collector includes an organic support layer and a metal conductive layer disposed on at least one surface of the organic support layer; the negative electrode active material layer includes at least a first active material layer, and the first active material layer is disposed on the surface of the metal conductive layer away from the organic support layer and includes a first active material; wherein, in a first cross section in a thickness direction of the negative electrode plate, the first active material has a size a in a direction parallel to the metal conductive layer (referred to as a first size), the first active material has a size b in the thickness direction of the negative electrode plate (referred to as a second size), and a and b satisfy $0.8 \leq a/b \leq 20$; and in a second cross section in the thickness direction of the negative electrode plate, the first active material has a size c in the direction parallel to the metal conductive layer (referred to as a third size), the first active material has a size d in the thickness direction of the negative electrode plate (referred to as a fourth size), and c and d satisfy $0.8 \leq c/d \leq 20$; the first cross section is parallel to a first direction, the second cross section is parallel to a second direction, and the first direction intersects with the second direction. The angle of intersection is preferably from 45 degrees to 90 degrees, and more preferably from 60 degrees to 90 degrees.

Figure 1B:
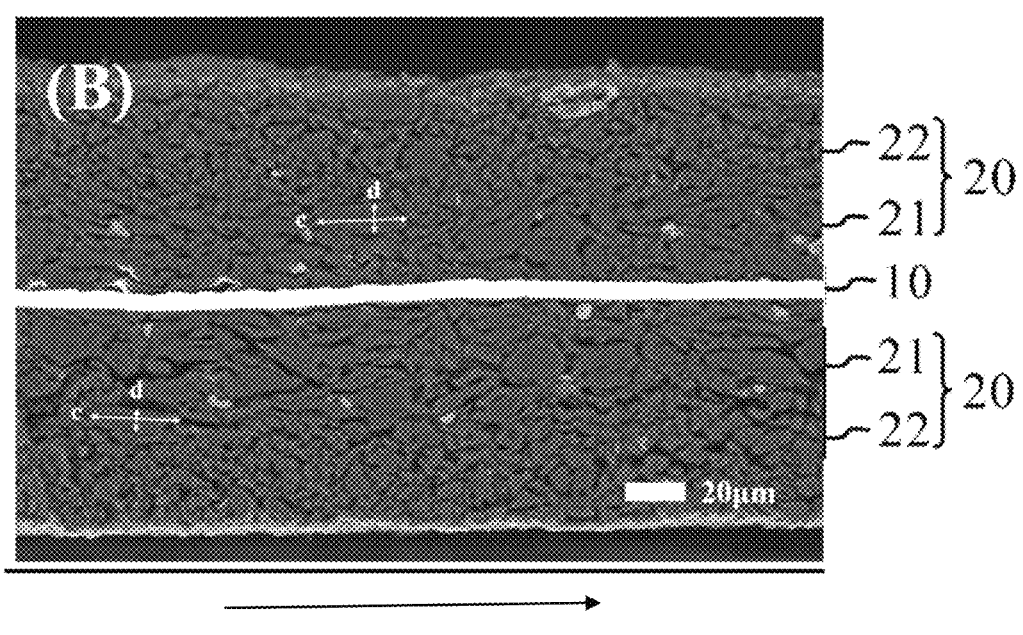

For example, the first direction is an MD direction (Machine Direction), and the second direction is a TD direction (Transverse Direction, perpendicular to the MD direction), as shown in FIG. 1. Of course, the first direction may be the TD direction, and the second direction may be the MD direction.

The negative electrode plate according to an embodiment of the present application adopts a negative electrode current collector composed of a metal conductive layer and an organic support layer, which can reduce the thickness of the metal conductive layer while meeting the requirements for the mechanical properties and electrical conductivity of the negative electrode current collector, and the density of the organic support layer is greatly less than the density of a metal, so compared with a negative electrode plate using a metal current collector, the weight can be greatly reduced, and the gravimetric energy density of a secondary battery using this negative electrode plate can be greatly increased.

In addition, in the negative electrode plate according to an embodiment of the present application, the first active material in contact with the metal conductive layer satisfies a/b and c/d within specific ranges, which can protect the metal conductive layer and effectively prevent the first active material from causing damage such as cracks to the metal conductive layer during rolling and expansion of the electrode plate, so that the metal conductive layer can have and maintain good electrical conductivity during the cycle of the battery, the negative electrode active material layer has relatively high active ion diffusion performance, and the negative electrode plate has relatively low impedance and good charge and discharge performance accordingly. Therefore, the battery using the negative electrode plate can have high gravimetric energy density and relatively long cycle performance.

In some embodiments, the metal conductive layer may have a thickness of 30 nm to 3 µm, and preferably from 300 nm to 2 µm. The metal conductive layer has the appropriate thickness, which is beneficial for enabling the negative electrode plate to have relatively small size and weight and relatively low resistance. For example, the metal conductive layer may have a thickness of 500 nm, 800 nm, 900 nm, 1 µm, 1.2 µm, or 1.5 µm.

In some embodiments, the metal conductive layer may include one or more of copper, nickel, silver, and alloys of the above metals. For example, the metal conductive layer includes one or more of copper and copper-nickel alloy, and further, such as copper. Content of a copper element in the copper-nickel alloy may be more than 90 wt %, such as 95 wt %.

In some embodiments, the organic support layer may have a thickness of 1 µm to 20 µm. Preferably, the organic support layer has a thickness of 2 µm to 15 µm, more preferably from 2 µm to 10 µm, and particularly preferably from 2 µm to 8 µm. For example, the organic support layer has a thickness of 2 µm, 3 µm, 4 µm, 5 µm, 6 µm, 7 µm, 8 µm, 10 µm, or 12 µm.

The thickness of the organic support layer is suitable to make it have sufficient mechanical strength so as not to break easily during processing and use and to well support and protect the metal conductive layer, and enables the battery to have relatively small size and weight, thereby increasing volume energy density and gravimetric energy density of the battery.

In some embodiments, the organic support layer includes one or more of polymer materials. Due to the low density of the polymer material, the weight of the negative electrode plate can be reduced greatly, thereby increasing gravimetric energy density of the battery.

In some embodiments, the polymer material may have a number average molecular weight of 50,000 to 1,000,000, and further from 50,000 to 200,000.

As an example, the polymer material may include one or more of polyamides, polyimides, polyesters, polyolefins, polyalkynes, siloxane polymers, polyethers, polyols, polysulfones, polysaccharide polymers, amino acid polymers, polysulfur nitrides, aromatic ring polymers, aromatic heterocyclic polymers, epoxy resin, phenolic resin, derivatives of the above materials, cross-linked products of the above materials, and copolymers of the above materials.

Preferably, the polymer material may include one or more of polycaprolactam (commonly known as nylon 6), polyhexamethylene adipamide (commonly known as nylon 66), polyparaphenylene terephthalamide (PPTA), polyisophthaloyl metaphenylene diamine (PMIA), polyethylene terephthalate (PET), polybutylene terephthalate (PBT), polyethylene naphthalate (PEN), polycarbonate (PC), polyethylene (PE), polypropylene (PP), polypropylene-ethylene (PPE), polyvinyl alcohol (PVA), polystyrene (PS), polyvinyl chloride (PVC), polyvinylidene fluoride (PVDF), polytetrafluoroethylene (PTEE), poly(sodium styrene sulfonate) (PSS), polyacetylene, silicone rubber, polyoxymethylene (POM), polyphenylene ether (PPO), polyphenylene sulfide (PPS), polyethylene glycol (PEG), cellulose, starch, protein, polyphenyl, polypyrrole (PPy), polyaniline (PAN), polythiophene (PT), polypyridine (PPY), and acrylonitrile-butadiene-styrene copolymer (ABS).

More preferably, the polymer material may include one or more of polyethylene terephthalate (PET), polybutylene terephthalate (PBT), polyethylene naphthalate (PEN), polyethylene (PE), polypropylene (PP), and sodium polystyrene sulfonate (PSS). Especially preferably, the polymer material may include one or more of polyethylene terephthalate (PET), polybutylene terephthalate (PBT), and polyethylene naphthalate (PEN).

In some embodiments, the organic support layer includes polymer materials and additives (i.e., a polymer composite material). The polymer materials may be selected from the aforementioned polymer materials. The additives may include one or more of metallic materials and inorganic non-metallic materials. The metal material additives may be one or more selected from aluminum, copper, nickel, titanium, iron, silver, and alloys of these metals. The inorganic non-metallic material additives may be one or more selected from carbon-based materials, alumina, silicon dioxide, silicon nitride, silicon carbide, boron nitride, silicate, and titanium oxide, such as one or more of glass materials, ceramic materials and ceramic composite materials. The carbon-based materials may be one or more selected from graphite, superconducting carbon, acetylene black, carbon black, Ketjen black, carbon dots, carbon nanotubes, graphene, and carbon nanofibers.

In some embodiments, the negative electrode current collector may have a Young's modulus E of 2 GPa to 20 GPa, and preferably from 4 GPa to 18 GPa. For example, the negative electrode current collector has a Young's modulus E of 5 GPa, 6 GPa, 7 GPa, 8 GPa, 9 GPa, 10 GPa, 12 GPa, or 15 GPa.

The negative electrode current collector has the appropriate Young's modulus E, and therefore, has relatively high mechanical strength and flexibility for winding. In addition, the negative electrode current collector will not be excessively stretched or deformed during the processing of the negative electrode plate and the battery, can prevent the metal conductive layer from breaking and subjecting to other damages, and enables the organic support layer and the metal conductive layer to have relatively high bonding strength and not to be prone to peeling, thereby improving the cycle stability of the negative electrode plate. The cycle performance of the battery is thus improved.

In order to further protect the metal conductive layer and improve the charge and discharge performance of the negative electrode plate, in some preferred embodiments, in the first cross section in the thickness direction of the negative electrode plate, the first size a and the second size b of the first active material satisfy $0.9 \leq a/b \leq 10$, more preferably $1 \leq a/b \leq 5$, and particularly preferably $2 \leq a/b \leq 4$. For example, a/b is equal to 1, 2, 2.5, 3, 3.5, 4, 4.5, 5, 7, or 9.

Further, in the second cross section in the thickness direction of the negative electrode plate, the third size c and the fourth size d of the first active material satisfy $0.9 \leq c/d \leq 10$, more preferably $0.95 \leq c/d \leq 6$, and particularly preferably $1.8 \leq c/d \leq 5$. For example, c/d is equal to 2, 2.2, 2.5, 2.8, 3, 3.5, 4, 4.5, 4.8, 5.5, 6, 8, or 9.

When a/b and c/d are within the ranges, the contact area between the first active material and the metal conductive layer is relatively large, which tends to or is surface-to-surface contact and can further protect the metal conductive layer from cracking and subjecting to other damage; and the first active material also has relatively high active ion transport performance, thereby further prolonging the cycle life of the battery.

In some preferred embodiments, the first active material has a volume average particle size $D_v50_1$ satisfying 5 µm≤$D_v50_1$≤25 µm. Preferably, 10 µm≤$D_v50_1$≤20 µm. More preferably, 12 µm≤$D_v50_1$≤18 µm. The inventors found that the $D_v50_1$ of the first active material within an appropriate range can not only better protect the metal conductive layer from cracking or subjecting to other damages, but also enables the negative electrode plate to have relatively high active ion transport performance, thereby further prolonging the cycle life of the battery.

In some embodiments, the first active material may be a graphite material, for example, one or more selected from natural graphite and flaky artificial graphite. When the first active material is natural graphite, the first active material layer can be directly made of flaky natural graphite; alternatively the active material coating can also be made of natural graphite having one or more of block-shaped, spherical-like and oval-like initial morphologies, and is rolled to slip between layers so as to meet the requirements of a/b and c/d.

The graphite material has a relatively small hardness, and can thus further improve the protective effect on the metal conductive layer. In particular, the natural graphite has low hardness and unique micro morphology, and can thus better protect the metal conductive layer from damage.

In some preferred embodiments, the initial morphology of natural graphite is one or more of block, spherical-like and oval-like shapes, and the natural graphite is rolled to form the first active material. After the natural graphite is rolled, its size in the thickness direction of the negative electrode plate decreases, and its size in the direction perpendicular to the thickness direction of the negative electrode plate increases, so it can meet the requirements of a/b and c/d. The first active material can effectively protect the metal conductive layer and also have relatively high gram capacity and relatively high electrochemical dynamics performance, which enables the battery to have relatively high energy density and cycle life. The initial morphology of the natural graphite is more preferably one or more of spherical-like and oval-like shapes.

In order to further prolong the cycle life of the battery, in some preferred embodiments, the negative electrode active material layer further includes a second active material layer, the second active material layer is disposed on the surface of the first active material layer away from the metal conductive layer, and the second active material layer includes a second active material. The second active material may include a graphite material, and preferably artificial graphite. The artificial graphite has relatively high gram capacity, its expansion effect during charge and discharge cycle is relatively small, and its side reaction with an electrolyte is less. Accordingly, the battery has relatively high energy density, and its cycle performance is further improved.

The particle morphology of the second active material may include one or more of flake, block, rod, spherical-like and oval-like shapes, and preferably includes one or more of spherical-like and oval-like shapes.

The inventor's research found that, when the first active material includes graphite materials, especially includes natural graphite, and the second active material includes artificial graphite, the performance of the secondary battery can be further improved in the case that the first active material and/or the second active material further satisfy one or more of the following parameters.

In some preferred embodiments, the second active material has a hardness greater than that of the first active material. In the negative electrode active material layer of the composite layer structure, the first active material in the first active material layer has relatively small hardness, which is beneficial for protecting the metal conductive layer. The second active material in the second active material layer has relatively large hardness, which is beneficial for maintaining the infiltrating performance of the electrolyte in the negative electrode active material layer during rolling or cyclic expansion of the electrode plate, and the second active material has relatively small volume changes with active ions intercalated therein, which is beneficial for reducing the cyclic expansion effect of the negative electrode plate. Therefore, the cycle performance of the battery can be further improved by reasonable combination of the first active material and the second active material.

In some preferred embodiments, the second active material has a volume average particle size $D_v50_2$ satisfying 5 µm≤$D_v50_2$≤25 µm. More preferably, 10 µm≤$D_v50_2$≤20 µm. Particularly preferably, 12 µm≤$D_v50_2$≤18 µm. The second active material has the appropriate particle size, which can reduce side reactions of the electrolyte on its surface and further improve the cycle performance of the battery. Meanwhile, the average particle size of the second active material is also suitable for enabling the negative electrode active material layer to have relatively high active ion and electron diffusion capability, thereby enabling the battery to have relatively high dynamic performance.

In some preferred embodiments, the volume average particle size $D_v50_1$ of the first active material and the volume average particle size $D_v50_2$ of the second active material satisfy: $D_v50_1 > D_v50_2$. As such, while the metal conductive layer is protected, the negative electrode active material layer has relatively high compaction density, thereby increasing energy density of the battery.

In some preferred embodiments, $D_v50_1$ of the first active material satisfies 5 µm≤$D_v50_1$≤25 µm, $D_v50_2$ of the second active material satisfies 5 µm≤$D_v50_2$≤25 µm, and $D_v50_1 > D_v50_2$. This can fully exert the synergistic effect of the first active material and the second active material, so that the battery has relatively high energy density, cycle performance and dynamic performance.

In some preferred embodiments, $D_v50_1$ of the first active material, $D_v50_2$ of the second active material, and the elastic modulus E of the negative electrode current collector satisfy: $|D_v50_1 - D_v50_2|/E \leq 2$; where, $D_v50_1$ and $D_v50_2$ are in µm, and E is in GPa. As such, the negative electrode active material layer has relatively high compaction density, and also has relatively high protective effect on the metal conductive layer, which reduces DC internal resistance (DCR) and impedance of the battery, thereby further improving the energy density, cycle performance and dynamic performance of the battery. Preferably, $0.3 \leq |D_v50_1 - D_v50_2|/E \leq 1.25$. For example, $|D_v50_1 - D_v50_2|/E$ is 0.35, 0.4, 0.45, 0.5, 0.55, 0.6, 0.65, 0.7, 0.8, 0.9, 1.0, 1.1, or 1.2.

$|D_v50_1 - D_v50_2|/E$ only involves numerical calculations. For example, if $D_v50_1$ of the first active material is 15 µm, $D_v50_2$ of the second active material is 12 µm, and the elastic modulus E of the negative electrode current collector is 5 GPa, then: $|D_v50_1 - D_v50_2|/E = |15 - 12|/5 = 0.6$.

In some preferred embodiments, the first active material has a graphitization degree of 94.8% to 97.0%, for example, 94.8%, 95%, 95.5%, 96%, 96.5%, 96.8%, or 97%. The first active material has relatively high graphitization degree, so its hardness is lower, and it has a better protective effect on the metal conductive layer during rolling and expansion of the electrode plate. The first active material has the appropriate graphitization degree, which enables it to have relatively low powder resistivity and to maintain a proper interlayer spacing, thereby improving the active ion and electron transport performance in the negative electrode active material layer and improving the cycle performance and dynamic performance of the battery.

In some preferred embodiments, the second active material may have a graphitization degree of 91% to 97.5%. The second active material has a graphitization degree of preferably 91.2% to 93.8%, such as 91.5%, 92%, 92.5%, 93%, 93.5%, 94%, or 95%. The graphitization degree of the second active material is smaller than that of the first active material. As such, the second active material has a relatively large hardness, which is beneficial for improving the cycle performance of the battery. When the graphitization degree of the second active material is within an appropriate range, the layer spacing of the second active material is relatively large, which can further improve the transport and diffusion performance of active ions, thereby improving the cycle performance and dynamic performance of the battery.

In some preferred embodiments, the first active material has a powder OI value greater than that of the second active material. The OI value represents an orientation index of the graphite material. When the first active material has a relatively large OI value, it easily forms surface-to-surface contact with the metal conductive layer in a large area, thereby protecting the metal conductive layer well and further improving the cycle performance of the battery. When the second active material has a relatively small OI value, it will have relatively large anisotropy, which enables the negative electrode active material layer to have relatively high ion transport performance, thereby improving the cycle performance and dynamic performance of the battery.

In some preferred embodiments, the first active material has a powder OI value of preferably 3.5 to 3.9, such as 3.51, 3.55, 3.60, 3.65, 3.70, 3.75, 3.80, or 3.85. The first active material having the appropriate OI value is suitable for well protecting the metal conductive layer, and can also reduce the expansion effect of the negative electrode plate, thereby further improving the cycle performance of the battery.

In some preferred embodiments, the second active material has a powder OI value of preferably 3.0 to 3.2, such as 3.05, 3.08, 3.10, 3.12, 3.15, or 3.18. The second active material having the appropriate powder OI value can further improve the ion transport performance of the negative electrode plate, and also reduce the expansion effect of the negative electrode plate, thereby further improving the cycle performance of the battery.

In some preferred embodiments, the first active material has a specific surface area of preferably 1.2 $m^2/g$ to 4 $m^2/g$, such as 1.3 $m^2/g$, 1.5 $m^2/g$, 1.8 $m^2/g$, 2 $m^2/g$, 2.5 $m^2/g$, 3 $m^2/g$, or 3.5 $m^2/g$. The first active material having the appropriate specific surface area has high electrochemical reaction activity and reduces side reactions of the electrolyte, thereby further improving the energy density and cycle performance of the battery.

In some preferred embodiments, the second active material has a specific surface area of preferably 1 $m^2/g$ to 2 $m^2/g$, such as 1.1 $m^2/g$, 1.2 $m^2/g$, 1.5 $m^2/g$, 1.6 $m^2/g$, or 1.8 $m^2/g$. The second active material having the appropriate specific surface area has high electrochemical reaction activity and can also reduce side reactions of the electrolyte, thereby enabling the battery to have high energy density and cycle performance.

In some preferred embodiments, the specific surface area of the first active material is greater than that of the second active material. The specific surface area of the first active material is relatively large, which can increase the electrochemical reaction activity of the first active material layer in the inner layer, thereby increasing the energy density of the battery. The specific surface area of the second active material is relatively small, which can reduce side reactions of the electrolyte in the negative electrode active material layer, thereby improving the cycle performance of the battery.

The inventors also found that, when the first active material includes graphite materials, especially includes natural graphite, and the second active material includes artificial graphite, the performance of the secondary battery can be further improved in the event that the negative electrode active material layer further satisfy one or more of the following parameters.

In some preferred embodiments, the first active material layer has a porosity of preferably 23% to 35%, such as 24%, 25%, 28%, 30%, 32%, or 33%. The first active material layer having the appropriate porosity enables it to have relatively high active ion and electron transport performance, and also enables the negative electrode active material layer to have a relatively high compaction density, so that the battery has relatively high energy density, cycle performance and dynamic performance.

In some preferred embodiments, the second active material layer has a porosity of preferably 18% to 30%, such as 19%, 20%, 23%, 25%, or 28%. The second active material layer having the appropriate porosity enables it to have relatively high active ion and electron transport performance, and also enables the negative electrode active material layer to have a relatively high compaction density, so that the battery has relatively high energy density, cycle performance and dynamic performance.

In some preferred embodiments, the porosity of the first active material layer is greater than that of the second active material layer. The first active material layer having relatively large porosity can improve the infiltrating property of the electrolyte in the inner layer of the negative electrode active material layer, thereby improving overall capacity and dynamic performance of the negative electrode active material layer. The second active material layer having relatively small porosity can meet the requirement of electrolyte infiltration and increase the compaction density of the negative electrode active material layer, thereby increasing the energy density of the battery.

In some preferred embodiments, the thickness of the first active material layer accounts for 10% to 50% of the total thickness of the negative electrode active material layer, such as 12%, 15%, 20%, 25%, 30%, 35%, 40%, 45%, or 48%. More preferably, the thickness of the first active material layer accounts for 20% to 35% of the total thickness of the negative electrode active material layer.

The first active material layer having the appropriate thickness proportion in the negative electrode active material layer can better protect the metal conductive layer, and enables the negative electrode plate to have relatively high charge and discharge performance, so that the battery has relatively high energy density and cycle performance.

In some preferred embodiments, the thickness of the negative electrode active material layer may be from 40 μm to 100 μm, such as 45 μm, 50 μm, 60 μm, 70 μm, 80 μm, 90 μm, or 95 μm. The negative electrode active material layer having the appropriate thickness can have relatively high reversible capacity and relatively high active ion and electron transport performance, thereby improving the energy density and cycle performance of the battery.

For example, the thickness of the negative electrode active material layer may be from 40 μm to 100 μm, and the thickness of the first active material layer accounts for 10% to 50%, preferably from 15% to 40%, and more preferably from 20% to 35% of the total thickness of the negative electrode active material layer.

In some embodiments, the first active material layer and/or the second active material layer may further independently include a conductive agent. As an example, the conductive agent may include one or more of graphite, superconducting carbon, acetylene black, carbon black, Ketjen black, carbon dots, carbon nanotubes, graphene, and carbon nanofibers.

In some embodiments, the first active material layer and/or the second active material layer may further independently include a binder. As an example, the binder may include one or more of styrene-butadiene rubber (SBR), water-based acrylic resin, ethylene-vinyl acetate copolymer (EVA), and polyvinyl alcohol (PVA).

In some embodiments, the first active material layer and/or the second active material layer may further independently include a thickener. As an example, the thickener may be sodium carcabinetymethyl cellulose (CMC-Na).

Figure 2:
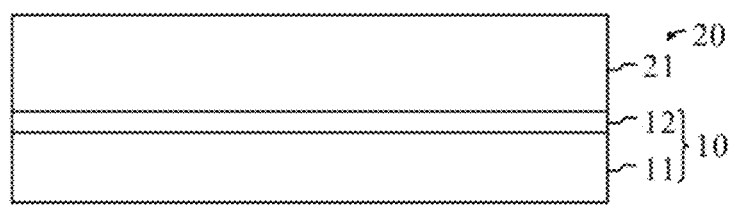
FIG. 2 is a schematic structural diagram of a negative electrode plate according to an embodiment of the present application.

FIG. 2 shows a negative electrode plate as an example. Referring to FIG. 2, the negative electrode plate includes a negative electrode current collector 10 and a negative electrode active material layer 20 disposed on the negative electrode current collector 10, the negative electrode current collector 10 includes an organic support layer 11 and a metal conductive layer 12 laminated on at least one surface of the organic support layer 11, the negative electrode active material layer 20 includes a first active material layer 21, and the first active material layer 21 is laminated on the surface of the metal conductive layer 12 away from the organic support layer 11.

Figure 3:
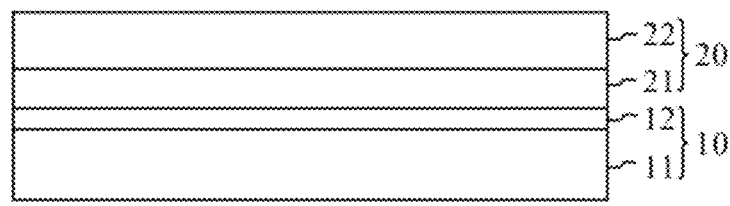
FIG. 3 is a schematic structural diagram of another negative electrode plate according to an embodiment of the present application.

FIG. 3 shows a negative electrode plate as an example. Referring to FIG. 3, the negative electrode plate includes a negative electrode current collector 10 and a negative electrode active material layer 20 disposed on the negative electrode current collector 10, the negative electrode current collector 10 includes an organic support layer 11 and a metal conductive layer 12 laminated on at least one surface of the organic support layer 11, the negative electrode active material layer 20 includes a first active material layer 21 and a second active material layer 22, the first active material layer 21 is laminated on the surface of the metal conductive layer 12 away from the organic support layer 11, and the second active material layer 22 is laminated on the surface of the first active material layer 21 away from the metal conductive layer 12.

It may be understood that the negative electrode current collector 10 may include an organic support layer 11 and metal conductive layers 12 laminated on two opposite surfaces of the organic support layer 11 in its thickness direction, and the negative electrode active material layers 20 may be respectively disposed on the two metal conductive layers 12 of the negative electrode current collector 10.

It should be noted that when the negative electrode active material layers 20 are disposed on the two surfaces of the negative electrode current collector 10, the parameters of the negative electrode active material layer 20 on either surfaces satisfying the present application is considered as falling within the protection scope of the present application.

In the negative electrode plate according to an embodiments of the present application, the metal conductive layer 12 may be formed on the organic support layer 11 by at least one means of mechanical rolling, bonding, vapor deposition, chemical plating, and electroplating to obtain the negative electrode current collector 10. The vapor deposition is preferably physical vapor deposition, such as vacuum evaporation, thermal evaporation, electron beam evaporation, or magnetron sputtering.

The negative electrode active material layer 20 may be prepared by a method known in the art. As an example, the first active material and the optional conductive agent, binder and thickener can be dispersed in a solvent which may be N-methylpyrrolidone (NMP) or deionized water to form a uniform first slurry; the first negative electrode slurry is coated on the metal conductive layer 12 of the negative electrode current collector 10 to obtain a first coating; the second active material and the optional conductive agent, binder and thickener are dispersed in a solvent which may be N-methylpyrrolidone (NMP) or deionized water to form a uniform second slurry; the second slurry is coated on the first coating to obtain a second coating; after the steps such as drying and rolling, the negative electrode active material layer 20 is obtained, that is, the negative electrode plate is obtained.

Herein, test methods for a/b and c/d of the first active material in the negative electrode plate are similar, and will be described below, taking a/b as an example. An exemplary test method for a/b includes: cutting a negative electrode plate of 1 cm×1 cm and pasting it to a sample stage as a sample to be tested; loading the sample stage into a vacuum sample bin and fixing it, and preparing a cross section (that is, the first cross section, as shown in FIG. 1A) of the negative electrode plate in the MD direction by using a cross-section polisher (such as JEOL IB-09010CP); and testing particles in the sample to be tested by using a scanning electron microscope & energy spectrometer (such as ZEISS SEM (sigma300)), wherein the magnification is 400×, and the particles counted in the scanned image include at least all particles in contact with the current collector (the scanned image include as many particles in contact with the current collector as possible to improve the accuracy of test results); wherein for higher accuracy of test results, 10 different areas in the sample to be tested can be randomly selected for scanning test, and an average value of the test results of the 10 test areas is taken.

The graphitization degrees of the first active material and the second active material have meanings known in the art, and can be measured by instruments and methods known in the art. For example, $d_{002}$ can be measured by an X-ray powder diffractometer (such as X'pert PRO type X-ray diffractometer of PANalytical, Netherlands), and then the graphitization degree G is calculated according to the formula of $G=(0.344-d_{002})/(0.344-0.3354)\times100\%$, where $d_{002}$ is a nano-scale interlayer spacing in the crystal structure of the graphite material.

The powder OI values of the first active material and the second active material have the meanings known in the art, and can be measured by instruments and methods known in the art. For example, an X-ray diffraction spectrum can be obtained by an X-ray powder diffractometer (X'pertPRO) according to the general principle of X-ray diffraction analysis methods and graphite lattice parameter determination methods JISK0131-1996 and JB/T4220-2011; OI value=$C_{004}/C_{110}$, where $C_{004}$ is a peak area of a characteristic diffraction peak of a 004 crystal plane of graphite, and $C_{110}$ is a peak area of a characteristic diffraction peak of a 110 crystal plane of graphite.

The volume average particle size $D_v50$ of the negative electrode active material has the meaning known in the art, and can be measured by instruments and methods known in the art. For example, $D_v50$ can be conveniently measured by a laser particle size analyzer, such as Mastersizer 2000E type laser particle size analyzer of Malvern Instruments Co., Ltd., UK, with reference to the GB/T19077-2016 particle size distribution laser diffraction method.

The specific surface area of the negative electrode active material has the meaning known in the art, and can be measured by instruments and methods known in the art. For example, the specific surface area can be tested by a nitrogen adsorption specific surface area analysis test method with reference to the standards of "gas adsorption BET method for measuring specific surface area of solid materials" of GB/T19587-2004, and calculated by a BET (Brunauer Emmett Teller) method, wherein the nitrogen adsorption specific surface area analysis test can be carried out by Tri Star II 3020 type specific surface and porosity analyzer of Micromeritics, USA.

In the negative electrode active material layer, the porosity of the first active material layer and the porosity of the second active material layer both have the meanings known in the art, and can be measured by instruments and methods known in the art. For example, the porosity is tested by AccuPyc II 1340 full-automatic true density tester of Micromeritics, USA, with reference to the national standard GB/T24586-2009.

The Young's modulus E of the negative electrode current collector has the meaning known in the art, and can be measured by instruments and methods known in the art. For example, the negative electrode current collector is cut into a 15 mm×200 mm sample, thickness h (μm) of the sample is measured with a high-qualify micrometer, a tensile test is performed with a tensile tester (such as Instron 3365) at normal temperature and pressure (25° C., 0.1 MPa), where an initial position is set such that the sample between clamps is 50 mm long, the sample is stretched at a speed of 5 mm/min, and load L (N) from stretching to break and device displacement y (mm) are recorded, so that stress E (GPa) =L/(15×h), strain η=y/50, a stress-strain curve is drawn, and the curve of an initial linear region is selected, wherein the slope of this curve is the Young's modulus E.

Secondary Battery

An embodiment of the present application provides a secondary battery. The secondary battery includes a positive electrode plate, a negative electrode plate and an electrolyte, wherein the negative electrode plate is the negative electrode plate described in the present application. During charge and discharge of the battery, active ions are repeatedly intercalated and deintercalated between the positive electrode plate and the negative electrode plate. The electrolyte conducts ions between the positive electrode plate and the negative electrode plate.

Examples of the secondary battery include, but are not limited to, lithium-ion secondary batteries, sodium ion batteries, magnesium ion batteries, etc.

The secondary battery of the present application adopts the negative electrode plate of the present application, and therefore can have relatively high energy density and relatively long cycle life. More effectively, the battery can also have relatively high dynamic performance.

In some embodiments, the positive electrode plate may include a positive electrode current collector and a positive electrode active material layer disposed on at least one surface of the positive electrode current collector. For example, the positive electrode current collector has two opposite surfaces in its thickness direction, and the positive electrode active material layer is formed on either or both of the two surfaces of the positive electrode current collector.

In some embodiments, the positive electrode current collector may be a metal foil, a carbon-coated metal foil, or a porous metal foil. The positive electrode current collector is selected from, for example, an aluminum foil, a carbon-coated aluminum foil, and the like.

The positive electrode active material layer may adopt a positive electrode active material known in the art. In some embodiments, the positive electrode active material may be selected from lithium transition metal oxides and modified compounds thereof, wherein the transition metal may be one or more of Mn, Fe, Ni, Co, Cr, Ti, Zn, V, Al, Zr, Ce, and Mg. The modified compounds of lithium transition metal oxides may be modified via doping and/or modified via surface coating. As an example, the lithium transition metal oxide is, for example, one or more of $LiMn_2O_4$, $LiNiO_2$, $LiCoO_2$, $LiNi_{1-y}Co_yO_2$ ($0<y<1$), $LiNi_aCo_bAl_{1-a-b}O_2$ ($0<a<1$, $0<b<1$, $0<a+b<1$), $LiMn_{1-m-n}Ni_mCo_nO_2$ ($0<m<1$, $0<n<1$, $0<m+n<1$), $LiMPO_4$ (M may be one or more of Fe, Mn, and Co), and $Li_3V_2(PO_4)_3$.

In some embodiments, the positive electrode active material layer may further include a conductive agent. As an example, the conductive agent may include one or more of graphite, superconducting carbon, acetylene black, carbon black, Ketjen black, carbon dots, carbon nanotubes, graphene, and carbon nanofibers.

In some embodiments, the positive electrode active material layer may further include a binder. As an example, the binder may include one or more of polyvinylidene fluoride (PVDF), polytetrafluoroethylene (PTFE), ethylene-vinyl acetate copolymer (EVA), polyvinyl alcohol (PVA), and polyvinyl butyral (PVB).

The positive electrode plate can be prepared according to a conventional method in the art. For example, the positive electrode active material and optional conductive agent and binder are dispersed in a solvent (such as N-methylpyrrolidone (NMP)) to form a uniform positive electrode slurry; the positive electrode slurry is coated on the positive electrode current collector, and the positive electrode plate is obtained after steps of drying and the like.

The separator is not specially limited, and may be any known porous separator with chemical and mechanical stability. For example, the separator may be selected from a glass fiber film, a non-woven film, a polyethylene film, a polypropylene film, a polyvinylidene fluoride film, and a multilayer composite film thereof.

The type of the electrolyte is not specifically limited in the present application, and may be selected according to requirements. For example, the electrolyte may be selected from at least one of solid electrolytes and liquid electrolytes (i.e., electrolyte liquid).

In some embodiments, the electrolyte adopts electrolyte liquid. The electrolyte liquid includes an electrolyte salt and a solvent.

In some embodiments, the organic solvent may be one or more selected from ethylene carbonate (EC), propylene carbonate (PC), ethyl methyl carbonate (EMC), diethyl carbonate (DEC), dimethyl carbonate (DMC), dipropyl carbonate (DPC), methyl propyl carbonate (MPC), ethyl propyl carbonate (EPC), butylene carbonate (BC), fluoroethylene carbonate (FEC), methyl formate (MF), methyl acetate (MA), ethyl acetate (EA), propyl acetate (PA), methyl propionate (MP), ethyl propionate (EP), propyl propionate (PP), methyl butyrate (MB), ethyl butyrate (EB), 1,4-butyrolactone (GBL), sulfolane (SF), dimethyl sulfone (MSM), methyl ethyl sulfone (EMS), and diethyl sulfone (ESE).

In some embodiments, the electrolyte salt may be one or more selected from $LiPF_6$ (lithium hexafluorophosphate), $LiBF_4$ (lithium tetrafluoroborate), $LiClO_4$ (lithium perchlorate), $LiAsF_6$ (lithium hexafluoroarsenate), LiFSI (lithium difluorosulfimide), LiTFSI (lithium bistrifluoromethanesulfonimide), LiTFS (lithium trifluoromethanesulfonate), LiDFOB (lithium difluorooxalate), LiBOB (lithium bisoxalate), $LiPO_2F_2$ (lithium difluorophosphate), LiDFOP (lithium difluorobisoxalate phosphate), and LiTFOP (lithium tetrafluorooxalate phosphate).

In some embodiments, the electrolyte may further optionally include additives. For example, the additives may include negative electrode film-forming additives, positive electrode film-forming additives, and additives that can improve some performances of the battery, such as additives that improve overcharge performance of the battery, additives that improve high-temperature performance of the battery, and additives that improve low-temperature performance of the battery.

The positive electrode plate, the separator, and the negative electrode plate are stacked in order with the separator between the positive and negative electrode plates to serve as an isolation to obtain a battery core, or to obtain a battery core after winding; and the battery core is placed in a package housing, injected with the electrolyte, and sealed to prepare the secondary battery.

Figure 4:
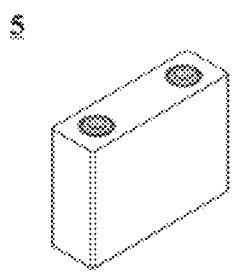
FIG. 4 is a schematic diagram of an embodiment of a secondary battery.

The present application does not have particular limitation to the shape of the secondary battery. The secondary battery may be cylindrical, square, or in other arbitrary shape. FIG. 4 shows a secondary battery 5 with a square structure as an example.

In some embodiments, the secondary battery may include an outer package for packaging the positive electrode plate, the negative electrode plate, and the electrolyte.

In some embodiments, the outer package of the secondary battery may be a soft bag, such as a pocket type soft bag. The material of the soft bag may be plastic, for example, it may include one or more of polypropylene (PP), polybutylene terephthalate (PBT), polybutylene succinate (PBS), and the like. The outer package of the secondary battery may also be a hard case, such as a hard plastic case, an aluminum case, a steel case, and the like.

Figure 5:
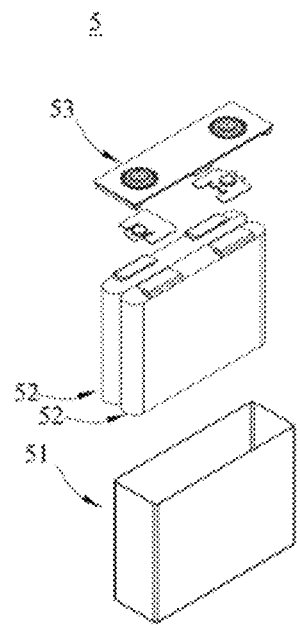
FIG. 5 is an exploded view of FIG. 4.

In some embodiments, referring to FIG. 5, the outer package may include a shell 51 and a cover plate 53. The shell 51 may include a bottom plate and side plates connected to the bottom plate, and the bottom plate and the side plates enclose a receiving cavity. The shell 51 has an opening communicated with the receiving cavity, and the cover plate 53 can cover the opening to close the receiving cavity.

The positive electrode plate, the negative electrode plate, and the separator may form an electrode assembly 52 by stacking or winding. The electrode assembly 52 is packaged in the receiving cavity. The electrolyte may adopt electrolyte liquid, and the electrolyte liquid infiltrates the electrode assembly 52.

The secondary battery 5 includes one or more electrode assemblies 52, which can be adjusted according to requirements.

In some embodiments, the secondary batteries may be assembled into a battery module, the battery module may include a plurality of secondary batteries, and the specific number can be adjusted according to the application and capacity of the battery module.

Figure 6:
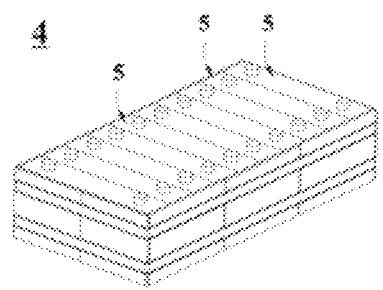
FIG. 6 is a schematic diagram of an embodiment of a battery module.

FIG. 6 shows a battery module 4 as an example. Referring to FIG. 6, in the battery module 4, the plurality of secondary batteries 5 may be arranged sequentially in a length direction of the battery module 4. Of course, they may also be arranged in any other way. Further, a plurality of secondary batteries 5 may be fixed by fasteners.

Optionally, the battery module 4 may further include a housing having a receiving space, and a plurality of secondary batteries 5 are received in the receiving space.

In some embodiments, the above-mentioned battery module may also be assembled into a battery pack, and the number of battery modules included in the battery pack can be adjusted according to the application and capacity of the battery pack.

Figure 7:
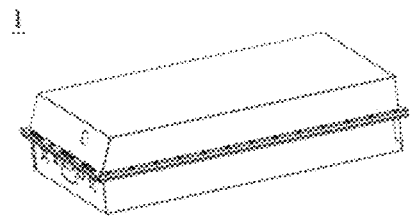
FIG. 7 is a schematic diagram of an embodiment of a battery pack.
Figure 8:
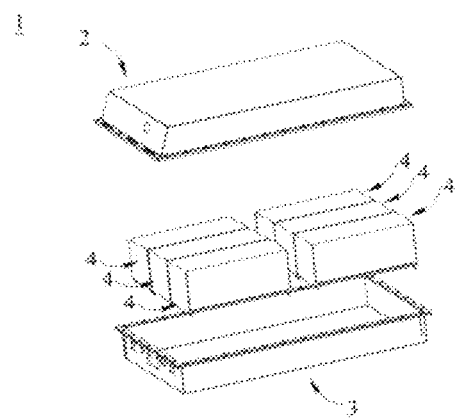
FIG. 8 is an exploded view of FIG. 7.

FIGS. 7 and 8 show a battery pack 1 as an example. Referring to FIGS. 7 and 8, the battery pack 1 may include a battery case and a plurality of battery modules 4 disposed in the battery case. The battery cabinet includes an upper case body 2 and a lower case body 3. The upper case body 2 can cover the lower case body 3 to form a closed space for receiving the battery modules 4. A plurality of battery modules 4 can be arranged in the battery case in any manner.

Apparatus

The third aspect of the present application provides an apparatus, the apparatus including the secondary battery according to the second aspect of the present application. The secondary battery can be used as a power source of the apparatus, or as an energy storage unit of the apparatus. The apparatus may be, but is not limited to, a mobile device (e.g., a mobile phone, a notebook computer, and the like), an electric vehicle (e.g., a pure electric vehicle, a hybrid electric vehicle, a plug-in hybrid electric vehicle, an electric bicycle, an electric scooter, an electric golf vehicle, an electric truck and the like), an electric train, a ship, a satellite, an energy storage system, and the like.

The apparatus may select the secondary battery, the battery module, or the battery pack according to its usage requirements.

Figure 9:
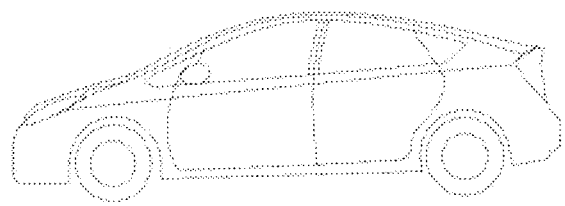
FIG. 9 is a schematic diagram of an embodiment of an apparatus using the secondary battery as a power source.

FIG. 9 shows an apparatus as an example. The apparatus is a pure electric vehicle, a hybrid electric vehicle, or a plug-in hybrid electric vehicle. In order to meet the requirements of the apparatus for high power and high energy density of the secondary battery, a battery pack or a battery module may be used.

As another example, the apparatus may be a mobile phone, a tablet computer, a notebook computer, and the like. The apparatus is generally required to be thin and light, and the secondary battery can be used as a power source.

EXAMPLES

The following examples more specifically describe the content disclosed in the present application, and these examples are only used for explanatory description, because various modifications and changes within the scope of the present disclosure are obvious to those skilled in the art. Unless otherwise stated, all parts, percentages, and ratios described in the following examples are based on weight, all reagents used in the examples are commercially available or synthesized according to conventional methods and can be directly used without further treatment, and all instruments used in the examples are commercially available.

Preparation of Secondary Batteries in Examples and Comparative Examples

Preparation of a Negative Electrode Plate

A negative electrode current collector was prepared by selecting a polymer sheet as an organic support layer, and performing surface cleaning treatment; plating a copper film on two surfaces of the organic support layer respectively by electroplating to obtain metal conductive layers, thereby obtaining a negative electrode current collector.

A negative electrode active material layer with a single-layer structure (Examples 1-19 and Comparative Examples 1-3) was prepared by dispersing a first active material, a conductive agent Super P, a binder SBR and a thickener CMC-Na at a mass ratio of 95:2:2:1 in deionized water to form a uniform negative electrode slurry; coating the metal conductive layer of the negative electrode current collector with the negative electrode slurry, thereby obtaining a negative electrode active material layer after steps of drying, cold pressing and the like, and further obtaining a negative electrode plate. The initial morphology of natural graphite was spherical-like.

A negative electrode active material layer with a double-layer structure was prepared by dispersing natural graphite as a first active material, a conductive agent Super P, a binder SBR and a thickener CMC-Na at a mass ratio of 95.5:2:1.5:1 in deionized water to form a uniform first slurry; coating the metal conductive layer of the negative electrode current collector with the first slurry, thereby obtaining a first coating after drying; dispersing artificial graphite as a second active material, a conductive agent Super P, a binder SBR and a thickener CMC-Na at a mass ratio of 95.2:2:1.8:1 in deionized water to form a uniform second slurry; coating the first coating with the second slurry, thereby obtaining a second coating after drying; obtaining a negative electrode active material layer after steps of cold pressing and the like, and further obtaining a negative electrode plate. The initial morphology of natural graphite was spherical-like.

Preparation of a Positive Electrode Plate

A positive electrode active material $LiNi_{0.8}Co_{0.1}Mn_{0.1}O_2$, a binder PVDF, and a conductive agent Super P at a mass ratio of 96:2:2 were dispersed in NMP to form a uniform positive electrode slurry, and then aluminum foil as a positive electrode current collector was coated with the positive electrode slurry, thereby obtaining a positive electrode plate after steps of drying, cold pressing and the like.

Separator

A polyethylene film was used as the separator.

Preparation of an Electrolyte

Ethylene carbonate (EC), ethyl methyl carbonate (EMC), and diethyl carbonate (DEC) at a volume ratio of 1:1:1 were mixed, and then $LiPF_6$ was dissolved uniformly in the solution to obtain an electrolyte, wherein $LiPF_6$ had a concentration of 1 mol/L.

Preparation of a Lithium-Ion Secondary Battery

The positive electrode plate, the negative electrode plate and the separator were wound into a battery core, which was put into a package housing, and in which the electrolyte was injected followed by sealing, thereby obtaining a lithium-ion secondary battery after steps of standing, compacting, formation, exhausting, and the like.

Relevant parameters of Examples 1-34 (Ex. 1-34) and Comparative Examples 1-3 (CE. 1-3) were shown in Table 1 to Table 3.

Test Section (1) Cold Pressing Belt Breaking Rate Test of the Negative Electrode Plate About 1000 meters of wound and coated electrode plate was taken and cold-pressed by a roll in a cold press, and the compaction density of the electrode plate was set to 1.7 g/cm³. The total number of meters before cold pressing was Y, the number of meters lost due to belt breaking during cold pressing was Y', then the cold pressing belt breaking rate=Y'/Y×100%.

(2) Cycle Performance Test of the Battery

At 25° C., the battery was charged to 4.2 V at a constant current rate of 1 C, then charged at a constant voltage to a current≤0.05 C, set standing for 5 min, discharged at the constant current rate of 1 C to 28 V, and set standing for 5 min. This was a charge and discharge cycle. This discharge capacity was recorded as an initial capacity. The battery was charged and discharged for 100 cycles according to this method, and the discharge capacity after 100 cycles was recorded. The cycle performance of the battery was the discharge capacity after 100 cycles/initial capacity×100%.

(3) Dynamic Performance Test of the Battery

At 25° C., the battery was charged to 4.2 V at a constant current rate of 1 C, then charged at a constant voltage to a current≤0.05 C, set standing for 5 min, discharged at the constant current rate of 1 C to 2.8 V, and set standing for 5 min. This discharge capacity was recorded as C1;

At 25° C., the battery was charged to 4.2 V at a constant current rate of 3 C, then charged at a constant voltage to a current≤0.05 C, set standing for 5 min, discharged at the constant current rate of 3 C to 2.8 V, and set standing for 5 min. This discharge capacity was recorded as C2;

The dynamic performance of the battery was C2/C1×100%.

Relevant parameters of Examples 1-34 and Comparative Examples 1-3 were shown in Table 2 to Table 3.

TABLE 1

| | Negative electrode current collector | | | | | |
|---|---|---|---|---|---|---|
| Number of current collector | Organic support layer | | | Metal conductive layer | | Young's modulus E of negative electrode current collector GPa |
| | Type of polymer | Molecular weight of polymer | Thickness μm | Material | Thickness μm | |
| 1 | PE | 50000 | 6 | Cu | 0.5 | 2.1 |
| 2 | PET | 120000 | 6 | Cu | 0.8 | 4.5 |
| 3 | PP | 80000 | 6 | Cu | 1 | 6.4 |
| 4 | PET | 150000 | 6 | Cu | 0.5 | 9.4 |
| 5 | PE | 50000 | 6 | Cu/Ni | 0.9 | 13.2 |
| 6 | PP | 90000 | 6 | Cu | 1 | 17.9 |
| 7 | PET | 130000 | 6 | Cu | 2 | 20 |
| 8 | Conventional metal current collector: 8 μm thick copper foil | | | | | |

In Table 1, the Cu/Ni alloy contained 95 wt % of Cu and 5 wt % of Ni.

TABLE 2

Negative electrode plate with negative electrode active material layer of single-layer structure

| No. | Number of current collectors | First active material Type | Graphitization degree (%) | $D_v50_1$ (μm) | OI value | Negative electrode active material layer Thickness (μm) | Porosity (%) | a/b | c/d | Cold pressing belt breaking rate (%) | Dynamic performance of battery (%) |
|---|---|---|---|---|---|---|---|---|---|---|---|
| Ex. 1 | 1 | Natural graphite | 96.8 | 20 | 3.71 | 60 | 28 | 3.0 | 2.95 | 10.0 | 60 |
| Ex. 2 | 2 | Natural graphite | 96.8 | 20 | 3.71 | | | | | 9.6 | 65 |
| Ex. 3 | 3 | Natural graphite | 96.8 | 20 | 3.71 | | | | | 8.0 | 69 |
| Ex. 4 | 4 | Natural graphite | 96.8 | 20 | 3.71 | | | | | 7.5 | 73 |
| Ex. 5 | 5 | Natural graphite | 96.8 | 20 | 3.71 | | | | | 6.0 | 75 |
| Ex. 6 | 6 | Natural graphite | 96.8 | 20 | 3.71 | | | | | 5.5 | 78 |
| Ex. 7 | 7 | Natural graphite | 96.8 | 20 | 3.71 | | | | | 3.0 | 82 |
| Ex. 8 | 3 | Natural graphite | 96.8 | 20 | 3.62 | | | 1.0 | 0.90 | 9 | 71 |
| Ex. 9 | 3 | Natural graphite | 96.8 | 20 | 3.55 | | | 2.0 | 2.20 | 10 | 73 |
| Ex. 10 | 3 | Natural graphite | 96.8 | 20 | 3.82 | | | 5.0 | 4.50 | 8.2 | 67 |
| Ex. 11 | 3 | Natural graphite | 96.8 | 19 | 3.73 | | | 7.0 | 7.60 | 7.6 | 65 |
| Ex. 12 | 3 | Natural graphite | 96.8 | 18 | 3.68 | | | 10 | 9.00 | 7.0 | 63 |
| Ex. 13 | 3 | Natural graphite | 96.8 | 18 | 3.81 | | | 15.0 | 14.50 | 6.4 | 62 |
| Ex. 14 | 3 | Natural graphite | 96.8 | 19 | 3.56 | | | 20 | 19.00 | 5.8 | 64 |
| Ex. 15 | 3 | Natural graphite | 96.8 | 5 | 3.71 | | | 3.0 | 2.95 | 7.8 | 67 |
| Ex. 16 | 3 | Natural graphite | 96.8 | 8 | 3.71 | | | | | 7.6 | 68 |
| Ex. 17 | 3 | Natural graphite | 96.8 | 12 | 3.71 | | | | | 7.5 | 69 |
| Ex. 18 | 3 | Natural graphite | 96.8 | 16 | 3.71 | | | | | 8 | 67 |
| Ex. 19 | 3 | Flaky artificial graphite | 94.7 | 20 | 3.81 | | | 3.0 | 2.85 | 6 | 65 |
| CE. 1 | 8 | Natural graphite | 96.8 | 20 | 3.53 | | | 3.0 | 2.95 | 2.5 | 82 |
| CE. 2 | 3 | Natural graphite | 96.8 | 20 | 3.92 | | | 0.7 | 0.5 | 10.2 | 67 |
| CE. 3 | 3 | Natural graphite | 96.8 | 20 | 3.9 | | | 21.6 | 20.80 | 6.7 | 58 |

TABLE 3

Negative electrode plate with negative electrode active material layer of double-layer structure

| No. | Number of current collectors | First active material layer — First active material Type | Graphitization degree (%) | $D_v50_1$ (μm) | OI value | Thickness $T_1$ (μm) | Second active material layer — Second active material Type | Graphitization degree (%) | $D_v50_2$ (μm) | OI value | Thickness $T_2$ (μm) |
|---|---|---|---|---|---|---|---|---|---|---|---|
| Ex. 20 | 3 | Natural graphite | 96.8 | 20 | 3.70 | 24 | Artificial graphite | 92.1 | 16 | 3.15 | 45 |
| Ex. 21 | 3 | | 94.8 | 20 | 3.70 | 24 | | 97.2 | 16 | 3.15 | 45 |
| Ex. 22 | 3 | | 94.8 | 20 | 3.70 | 24 | | 91.2 | 16 | 3.15 | 45 |
| Ex. 23 | 3 | | 94.8 | 20 | 3.70 | 24 | | 93.8 | 16 | 3.15 | 45 |
| Ex. 24 | 3 | | 96.8 | 16 | 3.70 | 24 | | 92.1 | 19 | 3.15 | 45 |
| Ex. 25 | 3 | | 96.8 | 12 | 3.70 | 24 | | 92.1 | 10 | 3.15 | 45 |
| Ex. 26 | 3 | | 96.8 | 15 | 3.70 | 24 | | 92.1 | 12 | 3.15 | 45 |
| Ex. 27 | 3 | | 96.8 | 18 | 3.70 | 24 | | 92.1 | 10 | 3.15 | 45 |
| Ex. 28 | 1 | | 96.8 | 20 | 3.70 | 24 | | 92.1 | 16 | 3.15 | 45 |
| Ex. 29 | 3 | | 96.8 | 20 | 3.50 | 24 | | 92.1 | 22 | 3.1 | 45 |
| Ex. 30 | 3 | | 96.8 | 20 | 3.62 | 24 | | 92.1 | 22 | 3.2 | 45 |
| Ex. 31 | 3 | | 96.8 | 20 | 3.88 | 24 | | 92.1 | 22 | 3.15 | 45 |
| Ex. 32 | 3 | | 96.8 | 20 | 3.70 | 8 | | 92.1 | 22 | 3.15 | 70 |
| Ex. 33 | 3 | | 96.8 | 20 | 3.70 | 40 | | 92.1 | 22 | 3.15 | 40 |
| Ex. 34 | 3 | | 96.8 | 20 | 3.70 | 15 | | 92.1 | 22 | 3.15 | 55 |

| No. | Whether $W_1 < W_2$ | ΔD/E | $T_1$ ratio (%) | Dynamic performance (%) | Cycle performance (%) |
|---|---|---|---|---|---|
| Ex. 20 | Yes | 0.63 | 35 | 85.0 | 92.0 |
| Ex. 21 | No | 0.63 | 35 | 83.8 | 91.0 |
| Ex. 22 | Yes | 0.63 | 35 | 85.0 | 93.5 |
| Ex. 23 | Yes | 0.63 | 35 | 84.8 | 91.7 |
| Ex. 24 | Yes | 0.47 | 35 | 85.0 | 92.0 |
| Ex. 25 | Yes | 0.31 | 35 | 86.0 | 92.0 |
| Ex. 26 | Yes | 0.47 | 35 | 85.3 | 92.2 |
| Ex. 27 | Yes | 1.25 | 35 | 85.9 | 92.1 |
| Ex. 28 | Yes | 1.90 | 35 | 84.7 | 92.0 |
| Ex. 29 | Yes | 0.31 | 35 | 85.7 | 92.5 |
| Ex. 30 | Yes | 0.31 | 35 | 85.2 | 92.6 |

TABLE 3-continued

| | Negative electrode plate with negative electrode active material layer of double-layer structure | | | | |
|---|---|---|---|---|---|
| Ex. 31 | Yes | 0.31 | 35 | 84.6 | 93.0 |
| Ex. 32 | Yes | 0.31 | 10 | 85.6 | 90.6 |
| Ex. 33 | Yes | 0.31 | 50 | 84.1 | 91.6 |
| Ex. 34 | Yes | 0.31 | 21 | 86.0 | 93.0 |

In Table 3: $W_1$ represented hardness of the first active material, $W_2$ represented hardness of the second active material; $\Delta D/E$ represented $|D_v 50_1 - D_v 50_2|/E$; $T_1$ ratio represented a percentage of the thickness of the first active material layer in the total thickness of the negative electrode active material layer.

It can be seen from the results in Table 2 that the negative electrode plate provided by the present application contained a negative electrode current collector composed of a metal conductive layer and an organic support layer, and the first active material in the negative electrode active material layer close to the metal conductive layer satisfied a/b and c/d within specific ranges, which can reduce its own weight and effectively prevent the first active material from causing damage such as cracks (relatively low cold pressing belt breaking rate) to the metal conductive layer, so that the negative electrode plate had relatively low impedance and good charge and discharge performance, and the secondary battery using the negative electrode plate had relatively high gravimetric energy density and cycle performance. Further, the battery also had high dynamic performance.

From the comparison between Example 7 and Comparative Example 1, it can be seen that the negative electrode plate of the present application adopted a composite current collector, which enabled the secondary battery adopting it to have relatively high gravimetric energy density, cycle performance and dynamic performance; the Comparative Example 1 adopted a metal copper foil current collector with low cold pressing belt breaking rate and relatively good dynamic performance, but had a reduced energy density of the battery due to its high weight.

With regard to the negative electrode plates of Comparative Example 2 and Comparative Example 3, because a/b and c/d of the first active material were not within specific ranges, the negative electrode plates hardly had relatively low cold pressing belt breaking rate and relatively high dynamic performance.

From the results of Examples 20-34, it can be seen that the first active material was reasonably combined with the second active material to form a negative electrode active material layer with a double-layer structure, which can further improve the cycle performance and dynamic performance of the battery.

Below are some exemplary embodiments of the present application.

Embodiment 1. A negative electrode plate, comprising:
a negative electrode current collector, comprising an organic support layer and a metal conductive layer disposed on at least one surface of the organic support layer;
a negative electrode active material layer, comprising at least a first active material layer, the first active material layer being disposed on the surface of the metal conductive layer away from the organic support layer, and the first active material layer comprising a first active material;
wherein in a first cross section in a thickness direction of the negative electrode plate, the first active material has a size a in a direction parallel to the metal conductive layer, the first active material has a size b in the thickness direction, and a and b satisfy 0.8≤a/b≤20; and
in a second cross section in the thickness direction of the negative electrode plate, the first active material has a size c in the direction parallel to the metal conductive layer, the first active material has a size d in the thickness direction, and c and d satisfy 0.8≤c/d≤20;
the first cross section is parallel to a first direction, the second cross section is parallel to a second direction, and the first direction intersects with the second direction.

Embodiment 2. The negative electrode plate according to Embodiment 1, wherein the negative electrode current collector further satisfies at least one of the following (1) to (3):
(1) the metal conductive layer has a thickness of 30 nm to 3 μm, and preferably from 300 nm to 2 μm;
(2) the organic support layer has a thickness of 1 μm to 20 μm, and preferably from 2 μm to 8 μm;
(3) the negative electrode current collector has a Young's modulus E satisfying 2 GPa≤E≤20 GPa.

Embodiment 3. The negative electrode plate according to Embodiment 1 or 2, wherein,
a and b satisfy 0.9≤a/b≤10, and preferably 2≤a/b≤4;
c and d satisfy 0.9≤c/d≤10, and preferably 1.8≤c/d≤5.

Embodiment 4. The negative electrode plate according to any one of Embodiments 1 to 3, wherein the first active material has a volume average particle size $D_v 50_1$ satisfying 5 μm≤$D_v 50_1$≤25 μm, and preferably 10 μm≤$D_v 50_1$≤20 μm.

Embodiment 5. The negative electrode plate according to any one of Embodiments 1 to 4, wherein the negative electrode active material layer further comprises a second active material layer, the second active material layer is disposed on the surface of the first active material layer away from the metal conductive layer, and the second active material layer comprises a second active material;
the first active material comprises a graphite material, preferably natural graphite, and more preferably, the natural graphite has an initial morphology that is one or more of spherical-like and oval-like shapes;
the second active material comprises artificial graphite.

Embodiment 6. The negative electrode plate according to Embodiment 5, wherein the second active material has a hardness greater than that of the first active material.

Embodiment 7. The negative electrode plate according to Embodiment 5 or 6, wherein the second active material has a volume average particle size $D_v 50_2$ satisfying 5 μm≤$D_v 50_1$≤25 μm, and preferably 10 μm≤$D_v 50_2$≤20 μm;
preferably, the volume average particle size $D_v 50_1$ of the first active material and the volume average particle size $D_v 50_2$ of the second active material satisfy: $D_v 50_1 > D_v 50_2$.

Embodiment 8. The negative electrode plate according to any one of Embodiments 5 to 7, wherein the volume average particle size $D_v 50_1$ of the first active material, the volume average particle size $D_v 50_2$ of the second active material, and the Young's modulus E of the negative electrode current collector satisfy:

$|D_v50_1-D_v50_2|/E \leq 2$, preferably $0.3 \leq |D_v50_1-D_v50_2|/E \leq 1.25$, wherein $D_v50_1$ and $D_v50_2$ are in μm, and E is in GPa.

Embodiment 9. The negative electrode plate according to any one of Embodiments 5 to 8, wherein the thickness of the first active material layer accounts for 10% to 50%, and preferably 20% to 35%, of the total thickness of the negative electrode active material layer.

Embodiment 10. The negative electrode plate according to any one of Embodiments 5 to 9, wherein the negative electrode plate further satisfies at least one of the following (1) to (5):
(1) the first active material has a graphitization degree of 94.8% to 97.0%, and/or the second active material has a graphitization degree of 91.2% to 93.8%;
(2) the first active material has a powder OI value of 3.5 to 3.9, and/or the second active material has a powder OI value of 3.0 to 3.2;
(3) the first active material has a specific surface area of 1.2 m²/g to 4 m²/g, and/or the second active material has a specific surface area of 1 m²/g to 2 m²/g; and preferably, the specific surface area of the first active material is greater than that of the second active material;
(4) the first active material layer has a porosity of 23% to 35%, and/or the second active material layer has a porosity of 18% to 30%; and preferably, the porosity of the first active material layer is greater than the porosity of the second active material layer;
(5) the negative electrode active material layer has a thickness of 40 μm to 100 μm.

Embodiment 11. A secondary battery, comprising the negative electrode plate according to any one of Embodiments 1 to 10.

Embodiment 12. An apparatus, comprising the secondary battery according to Embodiment 11.

Described above are merely specific embodiments of the present application, but the protection scope of the present application is not limited to this. Any skilled person who is familiar with this art could readily conceive of various equivalent modifications or substitutions within the disclosed technical scope of the present application, and these modifications or substitutions shall fall within the protection scope of the present application. Therefore, the protection scope of the present application shall be subject to the protection scope of the claims.

What is claimed is:

1. A negative electrode plate, comprising:
a negative electrode current collector, comprising an organic support layer and a metal conductive layer disposed on at least one surface of the organic support layer;
a negative electrode active material layer, comprising at least a first active material layer, the first active material layer being disposed on the surface of the metal conductive layer away from the organic support layer, and the first active material layer comprising a first active material;
wherein in a first cross section in a thickness direction of the negative electrode plate, the first active material has a particle size a in a direction parallel to the metal conductive layer, the first active material has a particle size b in the thickness direction, and a and b satisfy $0.8 \leq a/b \leq 20$; and
in a second cross section in the thickness direction of the negative electrode plate, the first active material has a particle size c in the direction parallel to the metal conductive layer, the first active material has a particle size d in the thickness direction, and c and d satisfy $0.8 \leq c/d \leq 20$; and
the first cross section is parallel to a first direction, the second cross section is parallel to a second direction, and the first cross section intersects with the second cross section; and
wherein the metal conductive layer has a thickness of 300 nm to 2 μm; and
wherein the organic support layer comprises one or more of polypropylene and polyethylene; and
wherein the negative electrode active material layer further comprises a second active material layer, the second active material layer is disposed on the surface of the first active material layer away from the metal conductive layer, and the second active material layer comprises a second active material; and
the volume average particle size $D_v50_1$ of the first active material, the volume average particle size $D_v50_2$ of the second active material, and the Young's modulus E of the negative electrode current collector satisfy:
$|D_v50_1-D_v50_2|/E \leq 2$, wherein $D_v50_1$ and $D_v50_2$ are in μm, and E is in GPa.

2. The negative electrode plate according to claim 1, wherein the negative electrode current collector further satisfies at least one of the following (1) to (2):
(1) the organic support layer has a thickness of 1 μm to 20 μm; and
(2) the negative electrode current collector has a Young's modulus E satisfying $2\ \text{GPa} \leq E \leq 20\ \text{GPa}$.

3. The negative electrode plate according to claim 1, wherein,
a and b satisfy $0.9 \leq a/b \leq 10$; and
c and d satisfy $0.9 \leq c/d \leq 10$.

4. The negative electrode plate according to claim 1, wherein the first active material has a volume average particle size $D_v50_1$ satisfying $5\ \mu m \leq D_v50_1 \leq 25\ \mu m$.

5. The negative electrode plate according to claim 1, wherein
the first active material comprises a graphite material; and
the second active material comprises artificial graphite.

6. The negative electrode plate according to claim 1, wherein the second active material has a hardness greater than that of the first active material.

7. The negative electrode plate according to claim 1, wherein the second active material has a volume average particle size $D_v50_2$ satisfying $5\ \mu m \leq D_v50_2 \leq 25\ \mu m$.

8. The negative electrode plate according to claim 1, wherein the thickness of the first active material layer accounts for 10% to 50%, of the total thickness of the negative electrode active material layer.

9. The negative electrode plate according to claim 1, wherein the negative electrode plate further satisfies at least one of the following (1) to (5):
(1) the first active material has a graphitization degree of 94.8% to 97.0%, and/or the second active material has a graphitization degree of 91.2% to 93.8%;
(2) the first active material has a powder Orientation Index OI value of 3.5 to 3.9, and/or the second active material has a powder Orientation Index OI value of 3.0 to 3.2;
(3) the first active material has a specific surface area of 1.2 m²/g to 4 m²/g, and/or the second active material has a specific surface area of 1 m²/g to 2 m²/g;
(4) the first active material layer has a porosity of 23% to 35%, and/or the second active material layer has a porosity of 18% to 30%; and (5) the negative electrode active material layer has a thickness of 40 μm to 100 μm.

10. A secondary battery, comprising the negative electrode plate according to claim 1.

11. An apparatus, comprising the secondary battery according to claim 10.

12. The negative electrode plate according to claim 1, wherein, a and b satisfy $2 \leq a/b \leq 4$.

13. The negative electrode plate according to claim 1, wherein, c and d satisfy $1.8 \leq c/d \leq 5$.

14. The negative electrode plate according to claim 1, wherein the first active material has a volume average particle size $D_v50_1$ satisfying $10 \, \mu m \leq D_v50_1 \leq 20 \, \mu m$.

15. The negative electrode plate according to claim 1, wherein
the first active material comprises natural graphite; and
the second active material comprises artificial graphite.

16. The negative electrode plate according to claim 1, wherein the second active material has a volume average particle size $D_v50_2$ satisfying $10 \, \mu m \leq D_v50_2 \leq 20 \, \mu m$.

17. The negative electrode plate according to claim 7, wherein the volume average particle size $D_v50_1$ of the first active material and the volume average particle size $D_v50_2$ of the second active material satisfy: $D_v50_1 > D_v50_2$.

18. The negative electrode plate according to claim 1, wherein the volume average particle size $D_v50_1$ of the first active material, the volume average particle size $D_v50_2$ of the second active material, and the Young's modulus E of the negative electrode current collector satisfy: $0.3 \leq |D_v50_1 - D_v50_2|/E \leq 1.25$, wherein $D_v50_1$ and $D_v50_2$ are in μm, and E is in GPa.

19. The negative electrode plate according to claim 1, wherein the thickness of the first active material layer accounts for 20% to 35%, of the total thickness of the negative electrode active material layer.

* * * * *